US011022557B2

(12) United States Patent
Dhawan et al.

(10) Patent No.: US 11,022,557 B2
(45) Date of Patent: Jun. 1, 2021

(54) TEST KIT FOR DETECTING ARSENIC

(71) Applicants: Ankush Kundan Dhawan, Newburgh, IN (US); Jeffery William Seyler, Sr., Evansville, IN (US)

(72) Inventors: Ankush Kundan Dhawan, Newburgh, IN (US); Jeffery William Seyler, Sr., Evansville, IN (US)

( * ) Notice: Subject to any disclaimer, the term of this patent is extended or adjusted under 35 U.S.C. 154(b) by 216 days.

(21) Appl. No.: 16/295,486

(22) Filed: Mar. 7, 2019

(65) Prior Publication Data

US 2019/0277767 A1  Sep. 12, 2019

Related U.S. Application Data

(60) Provisional application No. 62/640,014, filed on Mar. 8, 2018.

(51) Int. Cl.
*G01N 21/78* (2006.01)
*G01N 21/25* (2006.01)

(52) U.S. Cl.
CPC .......... *G01N 21/78* (2013.01); *G01N 21/255* (2013.01)

(58) Field of Classification Search
CPC ...... G01N 21/78; G01N 21/255; G01N 31/22; G01N 21/293
See application file for complete search history.

(56) References Cited

U.S. PATENT DOCUMENTS

2009/0298183 A1\* 12/2009 Dasgupta ............. G01N 35/085
436/73

\* cited by examiner

*Primary Examiner* — Jennifer Wecker
*Assistant Examiner* — Michael Paul Shimek
(74) *Attorney, Agent, or Firm* — Shirley A. Récipon

(57) ABSTRACT

In one embodiment the present invention describes a test kit for detecting arsenic concentration in a sample. The test kit includes a stable bromide compound capable of being made into a solution comprising bromine, a dye, wherein the bromine to the dye ratio is in a range from about 4:1 to about 5:1, an acid, and a quantification system for detecting the concentration of arsenic in the sample. In another embodiment the present invention describes a test kit for detecting a concentration of up to 0.03 parts per million of arsenic in a sample. A method of using the test kit to detect concentration of arsenic in a sample is also described.

20 Claims, 2 Drawing Sheets

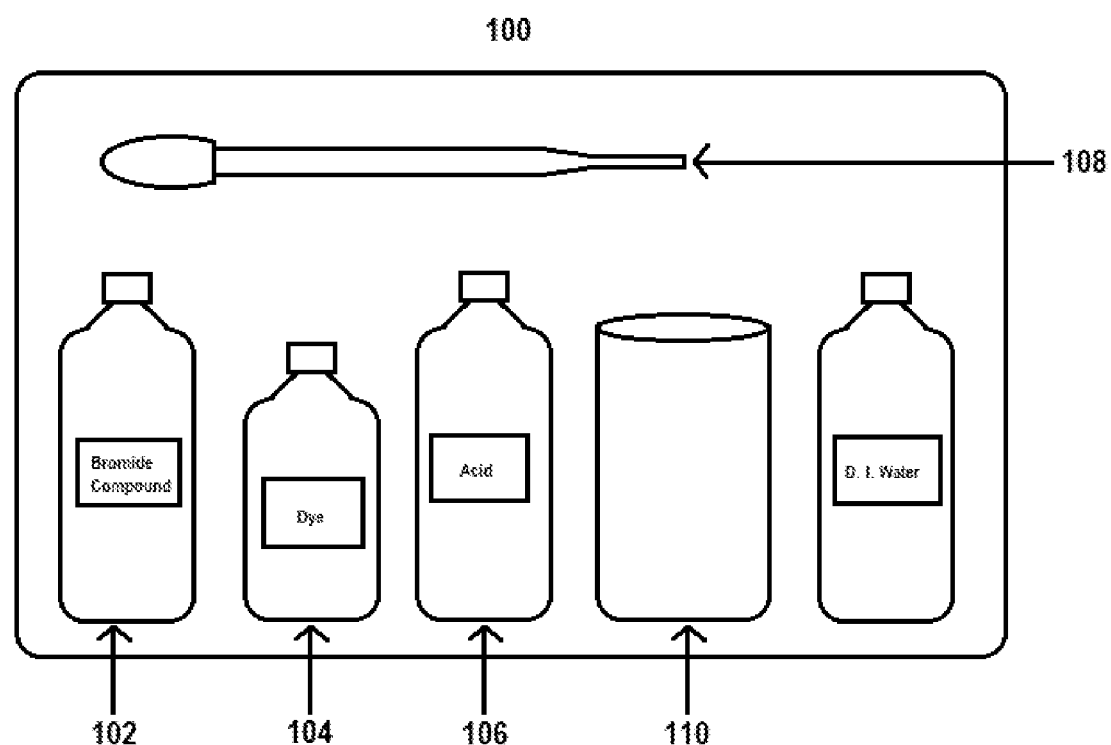
FIG. 1/2

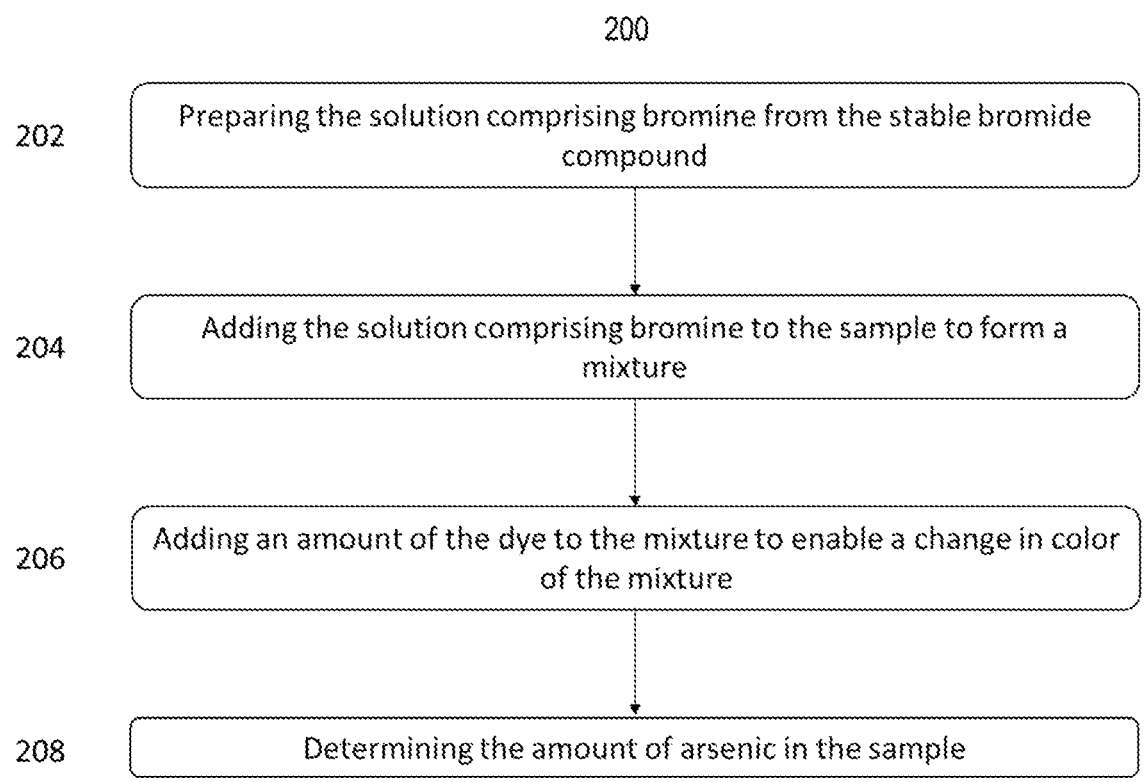
FIG. 2/2

TEST KIT FOR DETECTING ARSENIC

CROSS-REFERENCE TO RELATED APPLICATIONS

This application claims priority to U.S. Provisional Application No. 62/640,014 filed on 8 Mar. 2018, the contents of which are incorporated herein by reference.

BACKGROUND OF THE INVENTION

The present invention relates to a test kit for detecting arsenic. More specifically, the invention relates to a test kit for detecting trace levels of arsenic in a sample.

Arsenic is a toxic compound dangerous to humans, even at trace levels. Arsenic contamination of groundwater affects millions of people worldwide. Arsenic is also a known carcinogen. In 2006, the United States Environment Protection Agency (EPA) standard for drinking water defined 10 parts per billion (ppb) as the acceptable limit for arsenic concentration in drinking water. The World Health Organization (WHO) has set a limit of 50 ppb of arsenic in drinking water as the acceptable limit for developing countries.

Methods of detecting arsenic and test kits for detecting arsenic are well known in the art. Such methods include flow-injection analysis with hydride generation, atomic adsorption spectroscopy, induced plasma emission spectroscopy, cathodic stripping voltammetry, ion chromatography and coupled plasma mass spectroscopy, neutron activation analysis, electro-thermal atomic adsorption spectroscopy, fluorescence spectroscopy, graphite furnace atomic emission, inductively coupled plasma mass emission spectroscopy, (ICP-MS), hydride generation atomic adsorption, etc. These methods detect arsenic at the parts per billion (ppb) level, but are very expensive. These test methods are expensive and due to the lag-time between sending a sample and detecting it, several point-of-use test methods have become commercially available. However, these kits provide only discreet concentration values and the reliability of these test kits have been in question.

With recent advances in technology, spectrophotometric test methods based on chromogenic reagents provide for a cheaper, portable, as well as potentially accurate detection levels. One such method is described in the non-patent reference "Trace Level Arsenic Quantification through Methyl Red Bromination, American Journal of Analytical Chemistry, 2012, 3, 455-461", which describes a method of detecting arsenic in water with a lower limit of detection of 0.03 parts per million. The method described therein includes the oxidation of trivalent arsenic to pentavalent arsenic using bromine solution, and reacting the unreacted bromine with methyl red dye to estimate the concentration of arsenic in the sample. Indian patent application IN201741004792A and Japanese patent application JP2005172755A describe methods of detecting and measuring arsenic in samples, especially water samples. However, these methods are not effective in detecting arsenic concentrations in lower ranges with accuracy, especially in ranges of 5 parts per billion to 10 parts per billion, required for potable water testing.

Therefore, there still exists a need in the art for a test kit that is capable of detecting arsenic in trace amounts with accuracy and repeatability, especially within the range set by the US EPA and WHO standards. The method would need to be fast, easy and reliable.

SUMMARY

One embodiment of the present invention describes a test kit for detecting arsenic concentration in a sample. The test kit includes a stable bromide compound capable of being made into a solution comprising bromine, a dye; an acid; and a quantification system for detecting the concentration of arsenic in the sample. The bromine to the dye ratio is in a range from about 4:1 to about 5:1.

Another embodiment of the present invention describes a test kit for detecting a concentration of up to 0.03 parts per million of arsenic in a sample. The test kit includes a stable bromide compound capable of being made into a solution comprising bromine, a dye, an acid, and a quantification system for detecting the amount of arsenic in the sample.

Another embodiment of the present invention describes a method of using a test kit for detecting concentration of arsenic in a sample. The kit includes a stable bromide compound capable of being made into a solution comprising bromine, a dye, an acid, and a quantification system for detecting the amount of arsenic in the sample. The bromine to the dye ratio is in a range from about 4:1 to about 5:1. The method includes the steps of, preparing the solution comprising bromine from the stable bromide compound, adding the solution comprising bromine to the sample to form a mixture, adding an amount of the dye to the mixture to enable a change in color of the mixture, and determining the concentration of arsenic in the sample.

DESCRIPTION OF DRAWINGS

FIG. 1 is a representation of the test kit for detecting arsenic according to an embodiment of the invention.

FIG. 2 is a flowchart representing the method of using the test kit for detecting concentration of arsenic according to an embodiment of the invention.

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

In the specification and the claims which follow, reference will be made to a number of terms which shall be defined to have the following meanings:

The singular forms "a", "an" and "the" include plural referents unless the context clearly dictates otherwise. Optional or optionally means that the subsequently described event or circumstance may or may not occur, and that the description includes instances where the event occurs and instances where it does not. "Substantially" means a range of values that is known in the art to refer to a range of values that are close to, but not necessarily equal to a certain value.

Unless defined otherwise, all technical and scientific terms used herein have the same meaning as is commonly understood by one of skill in the art.

One embodiment of the present invention describes a test kit for detecting arsenic concentration in a sample. The test kit includes a stable bromide compound capable of being made into a solution comprising bromine, a dye; an acid; and a quantification system for detecting the concentration of arsenic in the sample. The bromine to the dye ratio is in a range from about 4:1 to about 5:1.

Another embodiment of the present invention describes a test kit for detecting a concentration of up to 0.03 parts per million of arsenic in a sample. The test kit includes a stable bromide compound capable of being made into a solution comprising bromine, a dye, an acid and a quantification system for detecting the amount of arsenic in the sample.

As depicted in FIG. 1 according to an embodiment of the present invention, the test kit 100 includes a stable bromide compound 102 capable of being made into a solution comprising bromine, a dye 104, an acid 106, a liquid transfer means 108, and a test container 110.

In an embodiment of the present invention, the quantification system is an analytical instrument. In an embodiment of the present invention, the quantification system is a spectrophotometer. The spectrometer may be used to measure the intensity of the change in colour, and using a calibration curve of color intensity versus concentration of arsenic, the amount of arsenic in the sample may be detected. For example, the absorbance of a sample with arsenic concentration 0 ppb had an absorbance of 0.0495, a sample with arsenic concentration of 5 ppb had an absorbance of 0.052, a sample arsenic concentration of 10 ppb had an absorbance of 0.054, a sample with arsenic concentration 15 ppb had an absorbance of 0.056, a sample with arsenic concentration 20 ppb had an absorbance of 0.058. Thus a calibration curve may be plotted between the absorbance and arsenic concentration. By measuring the absorbance of a sample with unknown arsenic concentration, and using the calibration curve, the concentration of arsenic in the sample may be detected.

In an embodiment of the present invention, the quantification system is a count of number of drops of dye. The number of drops of dye required to bring about the change in colour, may be compared against a calibration curve of number of drops of dye versus concentration of arsenic and the amount of arsenic in the sample may be detected. In an embodiment of the present invention, the quantification system is a visual comparison chart. The visual comparison chart may provide a reference for visual comparison of the intensity of the color, which may be correlated to a certain concentration of arsenic in the sample.

In an embodiment of the present invention, the concentration of arsenic to be detected is a range from about 0.003 parts per million to about 0.03 parts per million. The range can be from about 0.003, 0.004, 0.005, 0.006, 0.007, 0.008, 0.009, 0.01, 0.011, 0.012, 0.013, 0.014, 0.015, 0.016, 0.017, 0.018, 0.019, 0.02, 0.021, 0.022, 0.023, 0.024, 0.025, 0.026, 0.027, 0.028, 0.029, and about 0.03 parts per million, and intervals in between. In an embodiment of the present invention, the concentration of arsenic to be detected is a range from about 0.003 parts per million to about 0.01 parts per million. The range can be from about 0.003, 0.004, 0.005, 0.006, 0.007, 0.008, 0.009, and about 0.01, and intervals in between. In an embodiment of the present invention, the arsenic is trivalent arsenic.

In an embodiment of the present invention, the bromide compound is a mixture of a bromide salt and a bromate salt. In an embodiment of the present invention, the bromide compound is a mixture of a bromide salt and a bromate salt in the ratio 10:1 by weight. In an embodiment of the present invention, the bromide compound is a mixture of potassium bromide salt and potassium bromate salt. In an embodiment of the present invention, the bromide compound is a mixture of potassium bromide salt and potassium bromate salt in a ratio in a range from about 9:1 by weight to about 11:1 by weight. The range can be from about 9:1, 9.1:1, 9.2:1, 9.3:1, 9.4:1, 9.5:1, 9.6:1, 9.7:1, 9.8:1, 9.9:1 and intervals in between. In an embodiment of the present invention, the bromide compound is a mixture of potassium bromide salt and potassium bromate salt in the ratio 10:1 by weight.

In an embodiment of the present invention, the dye may be malachite green, chlorpromazine, methyl orange, rhodamine B, variamine blue, ammonium molybdate, 4-dimethylamino benzaldehyde, N—N-diphenylbendamidine or methyl red. In an embodiment of the present invention, the dye may be methyl red dye.

In an embodiment of the present invention, the concentration of dye may be in a range from about 0.001% to about 0.1%. The range can be from about 0.001, 0.005, 0.01, 0.015, 0.02, 0.025, 0.03, 0.035, 0.04, 0.045, 0.05, 0.055, 0.06, 0.065, 0.07, 0.075, 0.08, 0.085, 0.085, 0.09, 0.095, and about 0.1 and intervals in between. In an embodiment of the present invention, the concentration of dye may be in a range from about 0.005% to about 0.015%. The range can be from about 0.005, 0.006, 0.007, 0.008, 0.009, 0.01, 0.011, 0.012, 0.013, 0.014, and about 0.015% and intervals in between. In an embodiment of the present invention, the concentration of dye is 0.01%.

In an embodiment of the present invention, the ratio of the bromine to the dye is in a range from about 4:1 by volume to about 5:1 by volume. The range can be about 4:1, 4.1:1, 4.2:1, 4.3:1, 4.4:1, 4.5:1, 4.6:1, 4.7:1, 4.8:1, 4.9:1, and about 5:1 and intervals in between. In an embodiment of the present invention, the ratio of the bromine to the dye is in a range from about 4.3:1 by volume to about 4.7:1 by volume. The range can be about 4.3:1, 4.4:1, 4.5:1, 4.6:1, and about 4.7:1 and intervals in between. In an embodiment of the present invention, the ratio of the bromine to the dye is about 4.5:1 by volume.

In an embodiment of the present invention, the acid may be sulfuric acid. In an embodiment of the present invention, the concentration of acid is in a range of about 4 molar to about 4.5 molar. The range can be from about 4, 4.1, 4.2, 4.3, 4.4 and about 4.5 molar and intervals in between. In an embodiment of the present invention, the concentration of acid is in a range of about 4.2 molar to about 4.3 molar. The range can be from about 4.2, 4.21, 4.22, 4.23, 4.24, 4.25, 4.26, 4.27, 4.28, 4.29 and about 4.3 molar and intervals in between. In an embodiment of the present invention, the concentration of acid is about 4.25 molar.

In an embodiment of the present invention, the ratio of the bromine to the acid is in a range from about 0.35:1 by volume to about 0.4:1 by volume. The range can be from about 0.35:1, 0.36:1, 0.37:1, 0.38:1, 0.39:1 and about 0.4:1 and intervals in between. In an embodiment of the present invention, the ratio of the bromine to the acid is in a range from about 0.38:1 by volume to about 0.39:1 by volume. The range can be from about 0.38:1, 0.381:1, 0.382:1, 0.383:1, 0.384:1, 0.385:1, 0.386:1, 0.387:1 0.388:1, 0.389:1 and about 0.39:1 and intervals in between. In another embodiment of the present invention, the ratio of the bromine to the acid is about 0.385:1 by volume.

In an embodiment of the present invention, the ratio of the bromine to the dye is in a range from about 4:1 to about 5:1 and the ratio of the bromine to the acid is in a range from about 0.35:1 by volume to about 0.4:1 by volume. The range of the bromine to dye ratio can be about 4:1, 4.1:1, 4.2:1, 4.3:1, 4.4:1, 4.5:1, 4.6:1, 4.7:1, 4.8:1, 4.9:1, and about 5:1 and intervals in between, and the range of bromine to dye ratio can be from about 0.35:1, 0.36:1, 0.37:1, 0.38:1, 0.39:1 and about 0.4:1 and intervals in between. In another embodiment of the present invention, the ratio of the bromine to the dye is about 4.5:1 and the ratio of the bromine to the acid is about 0.385:1 by volume.

In an embodiment of the present invention, the concentration of bromine in the bromine solution is in a range from about 0.01 millimolar to about 0.02 millimolar. The range can be from about 0.01, 0.011, 0.012, 0.013, 0.014, 0.015, 0.016, 0.017, 0.018, 0.019 and about 0.02 millimolar and intervals in between. In another embodiment of the present invention, the concentration of bromine in the bromine solution is in a range from about 0.013 to about 0.015 millimolar. The range can be from about 0.013, 0.0131, 0.0132, 0.0133, 0.0134, 0.0135, 0.0136, 0.0137, 0.0138, 0.0139, 0.014, 0.0141, 0.0142, 0.0143, 0.0144, 0.0145, 0.0146, 0.0147, 0.0148, 00149 and about 0.015 millimolar and intervals in between In yet another embodiment of the present invention, the concentration of bromine in the bromine solution is about 0.014 millimolar.

In one embodiment of the present invention, the kit includes at least one liquid transfer means. In another embodiment of the present invention, the at least one liquid transfer means may be a dropper, a burette, a pipette, or a calibrated container. In another embodiment of the present invention, the kit further includes at least one test container. In yet another embodiment of the present invention, the at least one test container may be a beaker or a test tube.

In an embodiment of the present invention, the sample may be a water sample, a soil sample, a plant sample, a biological fluid sample, or an effluent sample. In another embodiment of the present invention, the sample may be a drinking water sample. In another embodiment of the present invention, the sample may be a groundwater sample.

Another embodiment of the present invention describes a method of using a test kit for detecting concentration of arsenic in a sample, comprising, a stable bromide compound capable of being made into a solution comprising bromine, a dye, an acid, at least one liquid transfer means, at least one test container; and a quantification system for detecting the amount of arsenic in the sample, the method comprising the steps of, preparing the solution comprising bromine from the stable bromide compound, adding the solution comprising bromine to the sample to form a mixture, adding an amount of the dye to the mixture to enable a change in color of the mixture, and determining the concentration of arsenic in the sample.

As depicted in FIG. 2 according to an embodiment of the present invention, the method 200 of using a test kit for detecting concentration of arsenic in a sample, includes the steps of preparing 202 the solution comprising bromine from the stable bromide compound, adding 204 the solution comprising bromine to the sample to form a mixture, adding 206 an amount of the dye to the mixture to enable a change in color of the mixture, and determining 208 the concentration of arsenic in the sample.

In one embodiment of the present invention, the concentration of arsenic in the sample may be from about 3 parts per billion (ppb) to about 30 parts per billion. The range can be about 3, 4, 5, 6, 7, 8, 9, 10, 11, 12, 13, 14, 15, 16, 17, 18, 19, 20, 21, 22, 23, 24, 25, 26, 27, 28, 29, and 30 ppb and intervals in between. In an embodiment of the present invention, the concentration of arsenic may be from about 3 parts per billion (ppb) to about 20 parts per billion. The range can be about 3, 4, 5, 6, 7, 8, 9, 10, 11, 12, 13, 14, 15, 16, 17, 18, 19, and 20 ppb and intervals in between. In another embodiment of the present invention, the concentration of arsenic may be from about 3 parts per billion (ppb) to about 10 parts per billion. The range can be about 3, 4, 5, 6, 7, 8, 9, and 10 ppb and intervals in between.

EXAMPLES

Example 1

Different concentrations of arsenic were prepared by diluting a stock solution of 100 parts per million concentration to prepare solutions of arsenic concentration of 0 ppb, 5 ppb, 10 ppb, 15 ppb and 20 ppb. These solutions were reacted with 0.27 ml of a freshly prepared 0.014 millimolar solution of bromine, in the presence of 0.7 ml of 4.25 molar sulphuric acid solution. 0.06 ml of 0.01% methyl red dye was then added to the mixture dropwise. The absorbance values of these solutions were measured using de-ionized water as a reference to generate a calibration curve. A proportional increase in the absorbance values was observed with increasing arsenic content. The ratio of bromine to acid herein was about 0.385:1. Interactions between the bromine and the acid may affect the reaction, and hence the ratio of bromine to acid needs to be maintained at an optimal value. Similarly, it is beneficial to maintain the ratio of bromine and dye at an optimal value. In the present example, the ratio of bromine to dye was about 4.5:1.

Example 2

A sample containing an unknown amount of arsenic was obtained. The sample was reacted with 0.27 ml of a freshly prepared 0.014 millimolar solution of bromine, in the presence of 0.27 ml of 4.25 molar sulphuric acid solution to form a mixture. 0.06 ml of 0.01% methyl red dye was then added to the mixture dropwise. The absorbance value of this solution was measured and compared with the calibration curve generated in example 1 above in order to estimate the concentration of unreacted bromine and hence the concentration of arsenic in the sample.

Example 3 (Test kit): A sample containing an unknown amount of arsenic was obtained. 4 ml of the sample was reacted with 6 drops of a freshly prepared 0.014 millimolar solution of bromine, in the presence of 2 ml of 4.25 molar sulphuric acid solution to form a mixture. A 0.005% solution of methyl red dye was then added to the mixture dropwise until a pinkish colour was obtained. The number of drops were counted in order to estimate the concentration of unreacted bromine and hence the concentration of arsenic in the sample. When arsenic was present in the sample, it was observed that about 2-6 drops of methyl red dye were required to produce a pinkish colour, while in case of a water sample with no arsenic, over 10-13 drops were required to produce the pinkish colour. Thus, when 2-6 drops are required to produce the colour change, it indicates that the water contains arsenic, and is not safe for consumption according to EPA and WHO standards. When over 10-13 drops are required to produce a colour change, it indicates that no arsenic is present in the sample, and the water is safe for consumption.

In one embodiment of the present invention the test kit described herein offers a simple, inexpensive and reliable test for quantification of arsenic in a sample at trace levels. In another embodiment of the present invention, this method has a detection limit of 0.003 parts per million (ppm), thus meeting the requirement of arsenic concentration measurement according to the EPA standards for drinking water.

It is to be understood that the above described embodiments are merely illustrative of numerous and varied other embodiments which may constitute applications of the principles of the invention. Such other embodiments may be readily understood by those skilled in the art without departing from the spirit or scope of this invention.

The invention claimed is:

1. A test kit for detecting arsenic concentration in a sample, comprising, a stable bromide compound, being made into a solution comprising bromine; a dye; and an acid, wherein the bromine to the dye ratio is in a range from about 4:1 to about 5:1, wherein the dye is selected from malachite green, chlorpromazine, methyl orange, rhodamine B, variamine blue, ammonium molybdate, 4-dimethylamino benzaldehyde, N-N-diphenylbendamidine or methyl red; and a quantification system for detecting the concentration of arsenic in the sample.

2. A test kit for detecting a concentration of up to 0.03 parts per million of arsenic in a sample, comprising,
 a stable bromide compound capable of being made into a solution comprising bromine;
 a dye;
 an acid; and
 a quantification system for detecting the amount of arsenic in the sample.

3. The test kit of claim 1, wherein the quantification system is an analytical instrument.

4. The test kit of claim 1, wherein the quantification system is a spectrophotometer.

5. The test kit of claim 1, wherein the quantification system is a count of number of drops of dye.

6. The test kit of claim 1, wherein the quantification system is a visual comparison chart.

7. The test kit of claim 1, wherein the concentration of arsenic is in a range from about 0.003 parts per million to about 0.03 parts per million.

8. The test kit of claim 1, wherein the bromide compound is a bromide-bromate solution.

9. The test kit of claim 1, wherein the arsenic is trivalent arsenic.

10. The test kit of claim 1, wherein the sample is selected from a water sample, a soil sample, a plant sample, a biological fluid sample, or an effluent sample.

11. A method of using a test kit for detecting concentration of arsenic in a sample, comprising, a stable bromide compound being made into a solution comprising bromine, a dye and an acid, wherein the bromine to the dye ratio is in a range from about 4:1 to about 5:1, wherein the dye is selected from malachite green, chlorpromazine, methyl orange, rhodamine B, variamine blue, ammonium molybdate, 4-dimethylamino benzaldehyde, N-N-diphenylbendamidine or methyl red; and a quantification system for detecting the concentration of arsenic in the sample, the method comprising the steps of:
 preparing the solution comprising bromine from the stable bromide compound; adding the solution comprising bromine to the sample to form a mixture; adding an amount of the dye to the mixture to enable a change in color of the mixture, and determining the concentration of arsenic in the sample.

12. The method of claim 11, wherein the ratio of the bromine to the dye is in a range from about 4:1 to about 5:1.

13. The method of claim 11, wherein the ratio of the bromine to the acid is in a range from about 0.35:1 to about 0.4:1.

14. The method of claim 11, wherein the quantification system is an analytical instrument.

15. The method of claim 11, wherein the quantification system is a spectrophotometer.

16. The method of claim 11, wherein the quantification system is a count of number of drops of dye.

17. The method of claim 11, wherein the quantification system is a visual comparison chart.

18. The method of claim 11, wherein the concentration of arsenic is in a range from about 0.003 parts per million to about 0.03 parts per million.

19. The method of claim 11, wherein the bromide compound is a bromide-bromate solution.

20. The method of claim 11, wherein the arsenic is trivalent Arsenic.

* * * * *